(12) United States Patent
Hydo et al.

(10) Patent No.: US 11,674,820 B2
(45) Date of Patent: Jun. 13, 2023

(54) ROAD SAFETY ANALYTICS DASHBOARD AND RISK MINIMIZATION ROUTING SYSTEM AND METHOD

(71) Applicant: Chevron U.S.A. Inc., San Ramon, CA (US)

(72) Inventors: Paul J. Hydo, Sugar Land, TX (US); Nicholas Jake Choruby, Flower Mound, TX (US); Joshua Brian DeBlaay, Cincinnati, OH (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 17/106,355

(22) Filed: Nov. 30, 2020

(65) Prior Publication Data

US 2021/0164801 A1 Jun. 3, 2021

Related U.S. Application Data

(60) Provisional application No. 62/942,647, filed on Dec. 2, 2019.

(51) Int. Cl.
| | | |
|---|---|---|
| *G01C 21/00* | (2006.01) | |
| *G08G 1/01* | (2006.01) | |
| *G01C 21/34* | (2006.01) | |
| *G08G 1/0968* | (2006.01) | |

(52) U.S. Cl.
CPC ..... *G01C 21/3889* (2020.08); *G01C 21/3461* (2013.01); *G01C 21/3867* (2020.08); *G08G 1/0145* (2013.01); *G08G 1/096838* (2013.01); *G08G 1/096844* (2013.01)

(58) Field of Classification Search
CPC ........... G01C 21/3889; G01C 21/3461; G01C 21/3867; G08G 1/0145; G08G 1/096838; G08G 1/096844
See application file for complete search history.

(56) References Cited

U.S. PATENT DOCUMENTS

| 5,206,641 | A  | * | 4/1993  | Grant ............... G08G 1/096716 |
|---|---|---|---|---|
| | | | | 340/905 |
| 8,365,014 | B2 | * | 1/2013  | Lynn ................... G06F 11/1402 |
| | | | | 714/15 |
| 9,625,266 | B1 | * | 4/2017  | Chintakindi ....... G01C 21/3691 |
| 9,646,428 | B1 | * | 5/2017  | Konrardy ............. B60W 40/09 |
| 10,121,148 | B1 | * | 11/2018 | Kozlowski ............. H04W 4/44 |
| 2014/0058763 | A1 | * | 2/2014  | Zizzamia ............... G06Q 40/08 |
| | | | | 705/4 |
| 2017/0309092 | A1 | * | 10/2017 | Rosenbaum ........ G01M 17/007 |
| 2018/0209801 | A1 | * | 7/2018  | Stentz ................ G01C 21/3415 |

* cited by examiner

*Primary Examiner* — Thomas Ingram
(74) *Attorney, Agent, or Firm* — King & Spalding LLP

(57) ABSTRACT

A vehicle safety analytics and routing system can be used to identify high risk areas and to assist in routing vehicles. The vehicle safety analytics and routing system brings together a variety of vehicle incident data that can be used in identifying high risk areas and in predicting risks for a vehicle. The routing aspect of the system uses vehicle incident data to assess the distribution of risk over a geographic area and to calculate risks associated with different potential vehicle routes. The calculated risks can be used to route vehicles around high risk intersections and stretches of road.

18 Claims, 15 Drawing Sheets

ROAD SAFETY ANALYTICS DASHBOARD AND RISK MINIMIZATION ROUTING SYSTEM AND METHOD

CROSS-REFERENCE TO RELATED APPLICATIONS

The present application claims the benefit of U.S. Provisional Patent Application No. 62/942,647, filed on Dec. 2, 2019, and the forgoing application is herein incorporated by reference in full.

TECHNICAL FIELD

The present disclosure relates generally to motor vehicle safety analytics, prediction, and risk minimization routing and scheduling.

BACKGROUND

The Permian basin is currently home to a multitude of oil and gas operations. Each operation requires using an additional multitude of incoming and outgoing shipping concerns, specifically using land-based transport, such as trucks. Further, the driving conditions and infrastructure in the Permian basin can be dangerous. As the number of oil and gas operations have grown, the number of vehicle incidents such as collisions is rising, leading to a 60% increase in the number of vehicle incidents since 2016, as well as a 130% increase in both incidents and fatalities for commercial motor vehicles since 2016. The challenges with vehicle traffic in the Permian Basin also can be found in other areas with extensive oil and gas operations.

SUMMARY

An embodiment of the disclosure is a method for determining the safety of roadways comprising: receiving data related to a plurality of vehicle incidents, wherein the received data comprises a date, a time, a coordinate, a type of vehicle, a type of incident, and an indication of severity; calculating a crash value for a location based on the data related to the plurality of vehicle incidents; and reporting the calculated crash value. In some embodiments, the location is a specific intersection, block, highway, a stretch of highway, an on-ramp, or an off-ramp. The data related to the plurality of vehicle incidents can be received from a transportation database.

Another embodiment of the disclosure is a method of routing vehicles comprising: receiving data related to safety of a plurality of locations, a starting location, and an ending location; calculating directions from the starting location to the end location based on the starting location, the end location, and the data related to the safety of a plurality of locations; and transmitting the directions to a vehicle or user. In some embodiments, calculating the directions comprises: calculating a plurality of routes between the starting location and the ending location; and calculating a risk score for each route, wherein the crash value is based on whether any locations within the route overlap with any location with the data related to the safety of the plurality of locations. The route with the safest risk score can be transmitted as directions to the vehicle or user. In some embodiments, the vehicle is a self-driving vehicle. In some embodiments, the data received additionally includes a start time. The step of calculating the crash value for each route can additionally be based on the times and days of incident data within the data related to the safety of a plurality of locations. That is, multiple different crash values can be saved in each cell each with an associated time value. In some embodiments, a journey waypoint is also received. In embodiments, the route includes a received journey waypoint.

An embodiment is a method for determining the safety of roadways comprising: receiving, at an analytics module, data related to a plurality of vehicle incidents for a geographic area of interest, wherein the data comprises a date, a time, a location, a type of incident, and an indication of severity; overlaying a grid of cells onto a map of the geographic area of interest; calculating, by the analytics module, a crash value for each cell of the grid based on the data related to the plurality of vehicle incidents; receiving, at the analytics module a starting location, and an ending location; calculating, by the analytics module, directions from the starting location to the end location based on the starting location, the end location, and the crash value; and transmitting the directions to a vehicle or user. The location can be one or more of specific intersection, block, highway, a stretch of highway, an on-ramp, a coordinate, or an off-ramp. The data related to the plurality of vehicle incidents can be received from a database. In some embodiments, calculating the directions comprises calculating a plurality of routes between the starting location and the ending location; and calculating a risk score for each route, wherein the risk score is based on the crash values in each cell that overlaps the route. The route with the safest risk score is transmitted as directions to the vehicle or user. In some embodiments, the vehicle is a self-driving vehicle. The data received can additionally include a start time. In some embodiments, the step of calculating the crash value for each cell of the grid is additionally based one or more of the time of day, day of the week, or month of incident data within the data related to a plurality of vehicle incidents. In some embodiments, a waypoint can be received, and calculating directions from the starting location to the end location is further based on the waypoint.

Another embodiment of the disclosure is a method of scheduling a driving route comprising: receiving data related to safety of a plurality of locations, a starting location, and an ending location; calculating routes between the starting location and the ending location at a plurality of different times; calculating an risk score for each route calculated, wherein the risk score is based on whether any locations in the route overlap with any location within the data related to the safety of the plurality of locations for the corresponding time within the plurality of times; and, transmitting a route and a time from the plurality of different times to a vehicle or user. In some embodiments, the plurality of different times comprises one or more of holiday data, time data, date data, and time zone data. In some embodiments, the route and a time from the plurality of different times with the safest risk score is transmitted as directions to the vehicle or user. The vehicle can be a self-driving vehicle. In some embodiments, the data received additionally includes a start time. Additionally, the method can comprise receiving data related to well production. In some embodiments, a journey waypoint is also received. In embodiments, the route includes a received journey waypoint.

In yet another embodiment, a method for routing a vehicle comprises receiving, by an analytics module, data related to a plurality of vehicle incidents for a geographic area of interest, wherein the data comprises a date, a time, a location, a type of incident, and an indication of severity. The analytics module can overlay a grid of cells onto a map of the geographic area of interest and calculate a crash value for each cell of the grid based on the data related to the plurality of vehicle incidents. The analytics module receives a starting location and an ending location and potential routes from the starting location to the ending location. The analytics module calculates a risk score for each of the potential routes based on the crash value for each cell through which the potential route passes and transmits at least one route from the potential routes to the vehicle or a user.

In yet another embodiment, a method of scheduling a driving route comprises receiving, by an analytics module, a starting location and an ending location. The analytics module determines a plurality of routes between the starting location and the ending location and each route of the plurality of routes is associated with a time of day. The analytics module calculates a risk score for each route that is determined, wherein the risk score is based on crash values along each route at the associated time of day. Lastly, the analytics module transmits, to a vehicle or user, a selected route and associated time of day from the plurality of routes.

These and other embodiments will be described in further detailed in the following description and associated drawings.

BRIEF DESCRIPTION OF THE DRAWINGS

FIG. 2a illustrates how data is organized into crash values for use in a routing system. FIG. 2b illustrates how data is organized into local incident groups for use in a dashboard.

DETAILED DESCRIPTION OF EXAMPLE EMBODIMENTS

Figure 1:
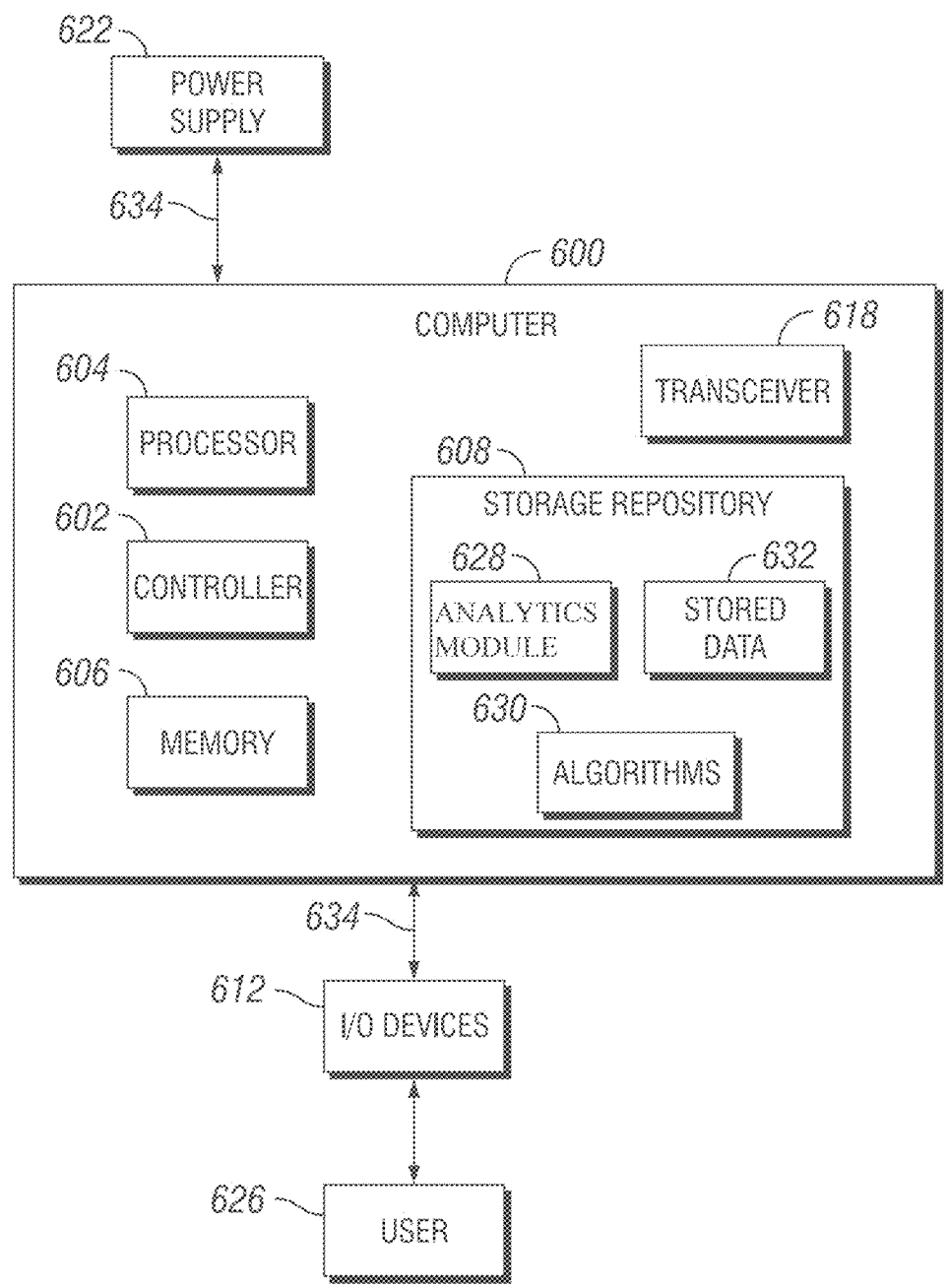
FIG. 1 is a block diagram of an example system for a road safety analytics and routing system.

The present disclosure relates generally to a road safety analytics system for optimizing routes, scheduling, and truckloads to reduce road safety incidents and improve efficiency. The present disclosure also relates generally to using information from the analytics system to provide minimization of risk within a driver's route. By understanding the causes behind the trends in vehicle incidents, routes can be optimized and high risk areas and roads can be avoided. Increased visibility can help determine the safest and most efficient scheduling for all parties, while avoiding high risk days and times. The dashboard can identify dangerous areas that drivers and vehicles can be routed around. Furthermore, including leased road data, that is not in public map databases, can improve routing and scheduling decisions.

Example embodiments will be described more fully hereinafter. It should be understood that such systems, computer readable media, and methods may be embodied in many different forms and should not be construed as limited to the example embodiments set forth herein. Rather, these example embodiments are provided so that this disclosure will be thorough and complete, and will fully convey the scope of the claims to those of ordinary skill in the art.

Terms such as "first", "second", and "within" are used merely to distinguish one component (or part of a component or state of a component) from another. Such terms are not meant to denote a preference or a particular orientation and are not meant to limit embodiments of the disclosure. In the following detailed description of the example embodiments, numerous specific details are set forth in order to provide a more thorough understanding of the invention. However, it will be apparent to one of ordinary skill in the art that embodiments of the disclosure may be practiced without these specific details. In other instances, well-known features have not been described in detail to avoid unnecessarily complicating the description.

A user may be any person or entity that interacts with the road safety analytics system. Examples of a user may include, but are not limited to a driver, a scheduler, or a passenger of a self-driving vehicle. There can be one or multiple users.

Example Dashboard Construction and Content

Systems of the disclosure can include an intranet-based computer system that is capable of communicating with various software. A computer system includes any type of computing device and/or communication device. Examples of such a system can include, but are not limited to, super computers, a processor array, a distributed parallel system, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Further, as discussed above, such a system can have corresponding software (e.g., graphical user interface software, analytics software). The software of one system can be a part of, or operate separately but in conjunction with, the software of another system.

Embodiments of the disclosure include a storage repository. The storage repository can be a persistent storage device (or set of devices) that stores software and data. Examples of a storage repository can include, but are not limited to, a hard drive, flash memory, some other form of solid-state data storage, or any suitable combination thereof. The storage repository can be located on multiple physical machines, each storing all or a portion of a database, protocols, algorithms, software modules, and/or other stored data according to some example embodiments. Each storage unit or device can be physically located in the same or in a different geographic location. In embodiments, the storage repository may be stored locally, or on cloud-based servers such as Amazon Web Services.

In one or more example embodiments, the storage repository stores one or more databases, AI Platforms, protocols, algorithms, software modules, and stored data. The protocols can include any of a number of communication protocols that are used to send and/or receive data between the processor, datastore, memory and the user. A protocol can be used for wired and/or wireless communication. Examples of protocols can include, but are not limited to, Modbus, profibus, Ethernet, and fiberoptic.

Systems of the disclosure can include a hardware processor. The processor executes software, algorithms, and firmware in accordance with one or more example embodiments. The processor can be a central processing unit, a multi-core processing chip, SoC, a multi-chip module including multiple multi-core processing chips, or other hardware processor in one or more example embodiments. The processor is known by other names, including but not limited to a computer processor, a microprocessor, and a multi-core processor. The processor can also be an array of processors.

In one or more example embodiments, the processor executes software instructions stored in memory. Such software instructions can include performing analysis on data received from the database, calculation of directions, and so forth. The memory includes one or more cache memories, main memory, and/or any other suitable type of memory. The memory can include volatile and/or non-volatile memory.

The processing system can be in communication with a computerized data storage system which can be stored in the storage repository. The data storage system can include a non-relational or relational data store, such as a MySQL or other relational database. Other physical and logical database types could be used. The data store may be a database server, such as Microsoft SQL Server, Oracle, IBM DB2, SQLITE, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, an RDBMS can be used. In those embodiments, tables in the RDBMS can include columns that represent coordinates. The tables can have pre-defined relationships between them. The tables can also have adjuncts associated with the coordinates.

In embodiments, the systems of the disclosure can include one or more I/O (input/output) devices that allow a user to enter commands and information into the system, and also allow information to be presented to the user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a display, a monitor, or projector), speakers, a printer, and a network card. Input devices can be used to enter data such as a starting location or an ending location. In embodiments, the starting location or ending location can also be generated automatically, for example from commercial routing software or a current GPS position. Input devices can include a microphone, a keyboard, a mouse, a touchpad, etc.

FIG. 1 is a non-limiting example of a road safety analytics system. It comprises a computer 600 with a controller 602, a processor 604, a memory 606, a transceiver 618 and a storage repository 608 which can comprise an analytics software module 628, stored data 632, and algorithms 630. The transceiver 618 can send and receive data. The analytics software module 628 can be implemented as computer readable instructions stored in memory. The analytics software module 628 can perform the methods described in FIGS. 2a, 2b, 3, and 15 and can render a graphical user interface in the form of a road safety analytics dashboard described in connection with FIGS. 4-14. Input/Output devices 612 are connected to the computer 600 through wired or wireless means 634. The computer 600 can receive power from a power supply 622. A bus (not shown) can allow the various components and devices to communicate with one another. A bus can be one or more of any of several types of bus structures, including a memory bus or memory controller, a peripheral bus, an accelerated graphics port, and a processor or local bus using any of a variety of bus architectures. A bus can include wired and/or wireless buses. The components shown in FIG. 1 are not exhaustive, and in some embodiments, one or more of the components shown in FIG. 1 may not be included in a specific embodiment. Further, one or more components shown in FIG. 1 can be rearranged. It should also be understood that in embodiments, the various elements shown here can be located together or located remotely from each other. For example, the database could be stored in a different location, such as on a server, from the processor used by the dashboard system or routing system.

Various techniques are described herein in the general context of software. Generally, software includes routines, programs, objects, components, data structures, and so forth that perform particular tasks or implement particular abstract data types. An implementation of these modules and techniques can be stored on or transmitted across some form of computer readable media. Computer readable media is any available non-transitory medium or non-transitory media that is accessible by a computing device. By way of example, and not limitation, computer readable media includes computer storage media.

Figure 2A:
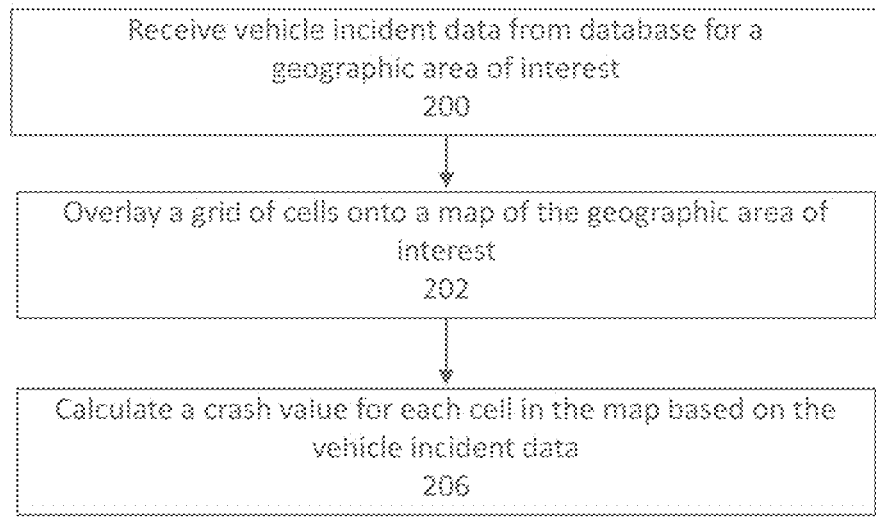
FIGS. 2a and 2b are flow charts which illustrate an example method of creating a vehicle safety dashboard and routing system.

FIG. 2a illustrates an example method of creating a map with crash value data. In step 200, vehicle incident data for a geographic area of interest is received from a database. The vehicle incident data can comprise a date, a time, a day of the week, a month, a location, a type of vehicle, a type of incident, and an indication of severity, injury type, and/or fatality count, for example. In specific embodiments, the location is specified in longitude and latitude coordinates. The database can be a public database or a private database. In embodiments, the data base is TxDOT CRIS and/or NM Department of Transportation records. The specific geographic area of interest could be a specific city, town, state, oil or gas field, or portion of an oil or gas field, for example. In step 202, a grid comprising cells is overlaid onto a map of the geographic area of interest. The cells can be any shape, for example square, rectangular, hexagonal, etc. The cells can represent any size within the geographic area of interest. For example, a cell could be 0.001 to 2 degrees latitude by 0.001 to 2 degrees longitude. In a specific embodiment, each cell is 0.02×0.02 degrees of latitude and longitude (1.38 miles×1.1 miles). In some embodiments, for two-way roads, each side of the road may be comprised in its own cell. In some embodiments, the cells are not all the same size. In specific embodiments, the cells within a town or city are smaller than cells found in rural areas.

In step 206, the analytics module calculates a crash value for each cell in the grid. The crash value is an indication of risk and is calculated based on vehicle incident data for the map location that overlaps with the cell location.

In embodiments, a crash value is calculated for each cell within a grid superimposed on a map. In one embodiment, a crash value for a cell is calculated by linear regression based on the vehicle incidents that happened within the cell. For example, linear regression can be used to predict crash severity based on the vehicle incident data located in the cell. Further, a total traffic volume estimation for each cell can be calculated: # cars per year that travel through the cell divided by 365 days per year is equal to the total traffic volume estimated per day. With this information, an example crash value can be calculated using the following formula:

$$\left[\frac{\text{\# Crashes}}{\text{Average Daily Traffic Amount}}\right] \times \left[\frac{\text{Mean(scaled severity)}}{\text{Inter-incident time}}\right] \quad \text{(Formula 1)}$$

In some embodiments, if a cell does not have crash data, the average risk of the neighboring cells may be used. In other embodiments, if a cell does not have crash data, the cell is given a crash value of 0. Crash values within a route may also take into account school zones and arrival and dismissal times, effectively routing vehicles around school zones during arrival and dismissal.

Additionally, various weighting factors can be applied to the calculation of the crash value. For example, more recent vehicle incident data may be more relevant and assigned a higher weighting than older vehicle incident data. In another embodiment, a cell could have different crash values for different days of the week, such as weekdays or weekends, or different crash values for different times of the day, such as rush hour or known shift changes.

Figure 2B:
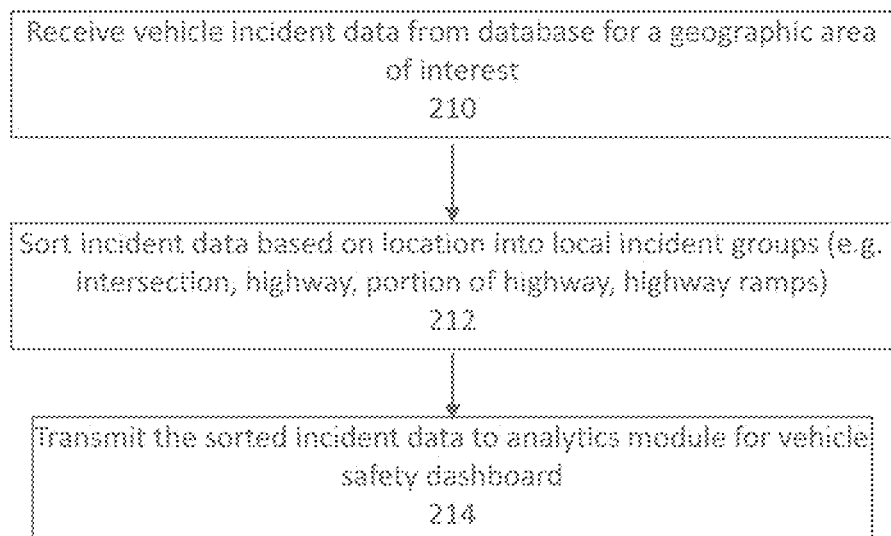

FIG. 2b illustrates an example method of presenting a vehicle safety dashboard. The vehicle safety dashboard is a user interface for presenting vehicle data and results from the analytics module 628. In step 210, the analytics module 628 receives vehicle incident information from a database, which can be the same data that was received in step 200. The vehicle incident data can comprise a date, a time, a day of the week, a month, a location, a type of vehicle, a type of incident, and an indication of severity, injury type, and/or fatality count, for example. In specific embodiments, the location is specified in longitude and latitude coordinates. The database can be a public database or a private database. In embodiments, the data base is TxDOT CRIS and/or NM Department of Transportation records. In step 212, the vehicle incident data is sorted based on location into local incident groups. The location could be a specific intersection, highway, portion of a highway, block in a city, a specific side of a highway, a highway on-ramp, a highway off-ramp, for example.

Figure 3:
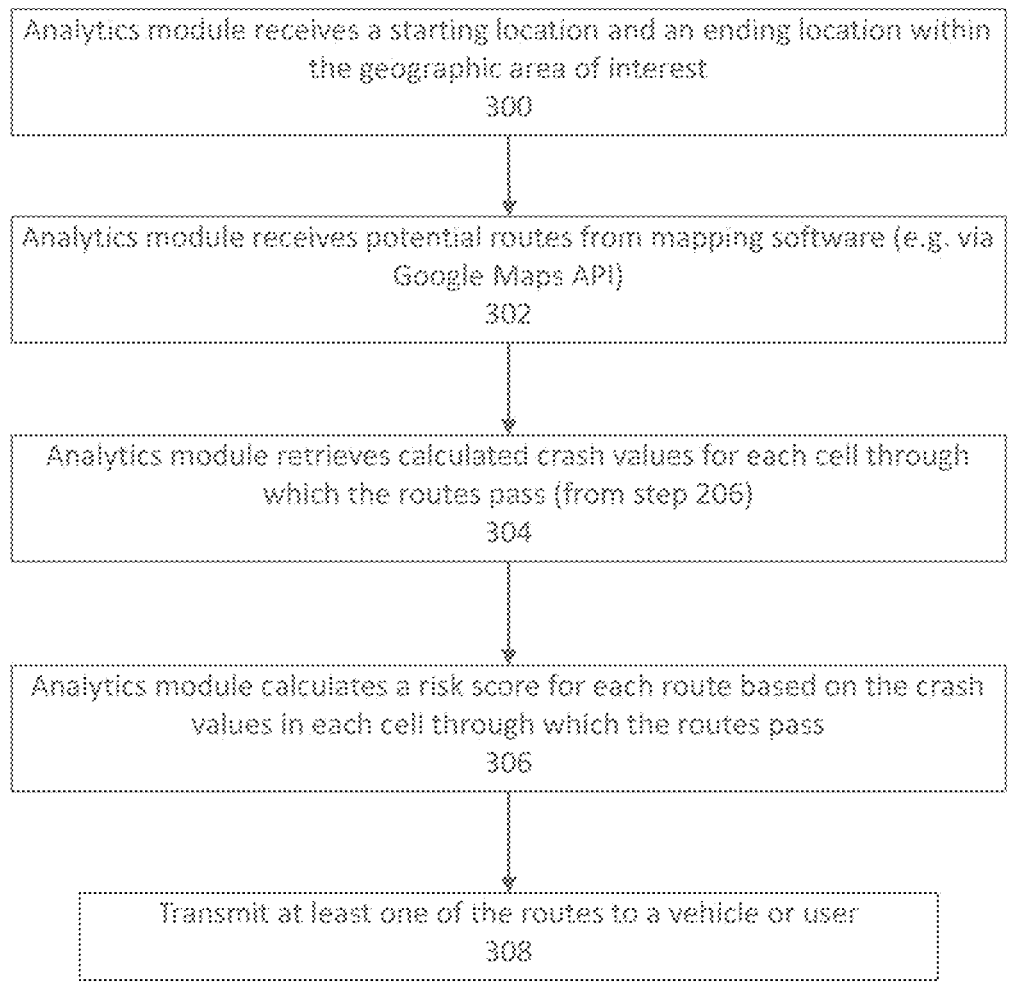
FIG. 3 is a flow chart which illustrates an example method for routing a vehicle in a safe manner.

FIG. 3 illustrates an example method for routing a vehicle in a safe manner using the road safety analytics system. The method begins at step 300 with the analytics module 628 receiving a starting location and an ending location within the geographic area of interest. In step 302, the analytics module 628 receives potential routes from the starting location to the ending location from mapping software. The mapping software can reside in the road safety analytics system or can be accessed via API calls to a third party mapping software such as Google Maps.

In step 304, the analytics module 628 identifies the cells through which the potential routes pass and retrieves the crash values for those cells which were calculated in step 206. In step 306, a risk score is calculated for each route based on the crash values for each cell through which a potential route passes. For example, a potential route may pass through five cells on the map in traversing from the starting location to the ending location of the route. The risk score can be calculated using the crash value that is assigned to each of those five cells through which the potential route passes.

In some embodiments, the risk score is the average value of all of the crash values in cells through which the route passes. For example, if a first route from a starting location to an ending location passes through cells with the following crash values (inclusive of the starting and ending cell): 1, 0.75, 1, 1, 0.25, then the risk score for the first route would be calculated as 1+0.75+1+1+0.25/5=0.8 If a second route from the same starting location to the same ending location passes through cells with the following crash values (inclusive of the starting and ending cell): 1, 0.5, 2, 1.5, 0.25, then the risk score for the second route would be calculated as 1+0.5+2+1.5+0.25/5=1.05. In this case, the first route would have the lower calculated risk and would be the recommended route to take. It should be noted that the crash values may change depending on the time of day, the day of the week, or the month, for example. For example, the first route might be better during rush hour, but the second route might be better a night. As such, the crash values for each cell can be updated regularly or a cell can have multiple crash values, each of which is associated with a particular day or time, for example.

Lastly, in step 308, the analytics module 628 can use the risk scores to select a route which is then transmitted to a user or to a vehicle. The analytics module 628 can be configured to transmit the route with the lowest (safest) risk score. Alternatively, the analytics module 628 can provide the user or vehicle with multiple potential routes ranked according to their respective risk scores. It should be understood that the directions may then be implemented by the driver of the vehicle. If the vehicle is a self-driving vehicle, it is understood that the vehicle may implement the directions autonomously. The directions may also consider school zones and school arrival and dismissal information.

Embodiments of the data repositories from which incident data is received can include data from state DMVs, Federal data bases, and the Railroad Commission. Specific data repositories include the Texas Department of Transportation Crash Record Information System, New Mexico Department of Transportation, HIS Enerdeq, and/or Mix Telematics.

Example Search, Analysis, and Other Tools

An embodiment of a dashboard graphical interface offers several search and analysis tools that allow users to analyze vehicle incident data in multiple different ways. Embodiments of the disclosure include analysis tools for comparison and/or summarization of the data analyzed. For individual studies, the distribution of the data can be visualized, and relevant statistics calculated.

Figure 4:
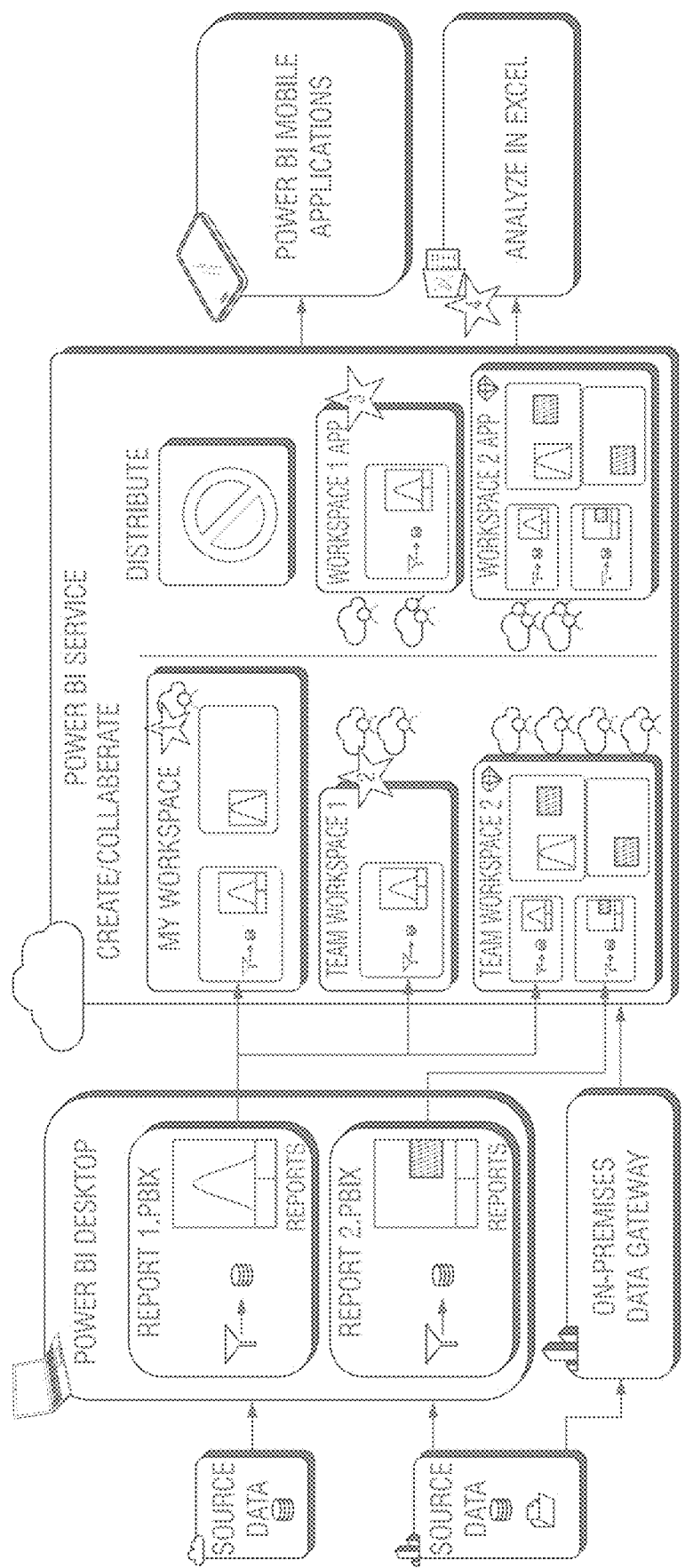
FIG. 4 illustrates one example flow of data for implementation of the dashboard.

FIG. 4 illustrates one example flow of data for implementation of the dashboard. This example includes data that was collected from Texas, New Mexico, and the railway commission. A dashboard was developed which included data from a multitude of vehicle incident databases.

Figure 5:
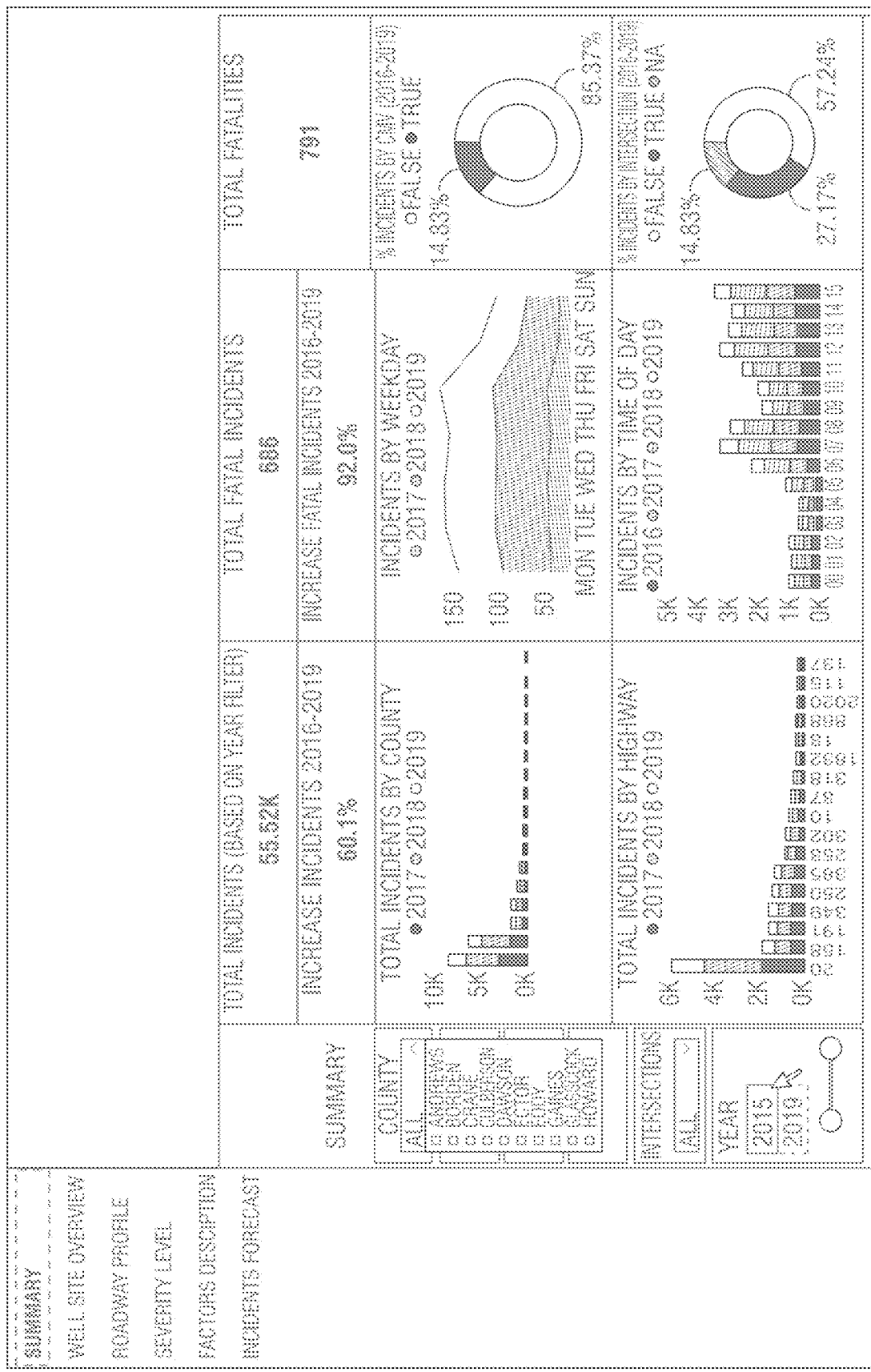
FIG. 5 is a screenshot of a summary screen in the dashboard.

FIG. 5 is a screenshot of a summary screen in the dashboard. The summary screen includes the total number of incidents based on a filter, and the increase in incidents within a year range as well as the total number of fatalities for that year. The data can be filtered or sorted by day of the week, time of day, year, county, incidents by commercial vehicle vs. private vehicles, and by intersections.

Figure 6:
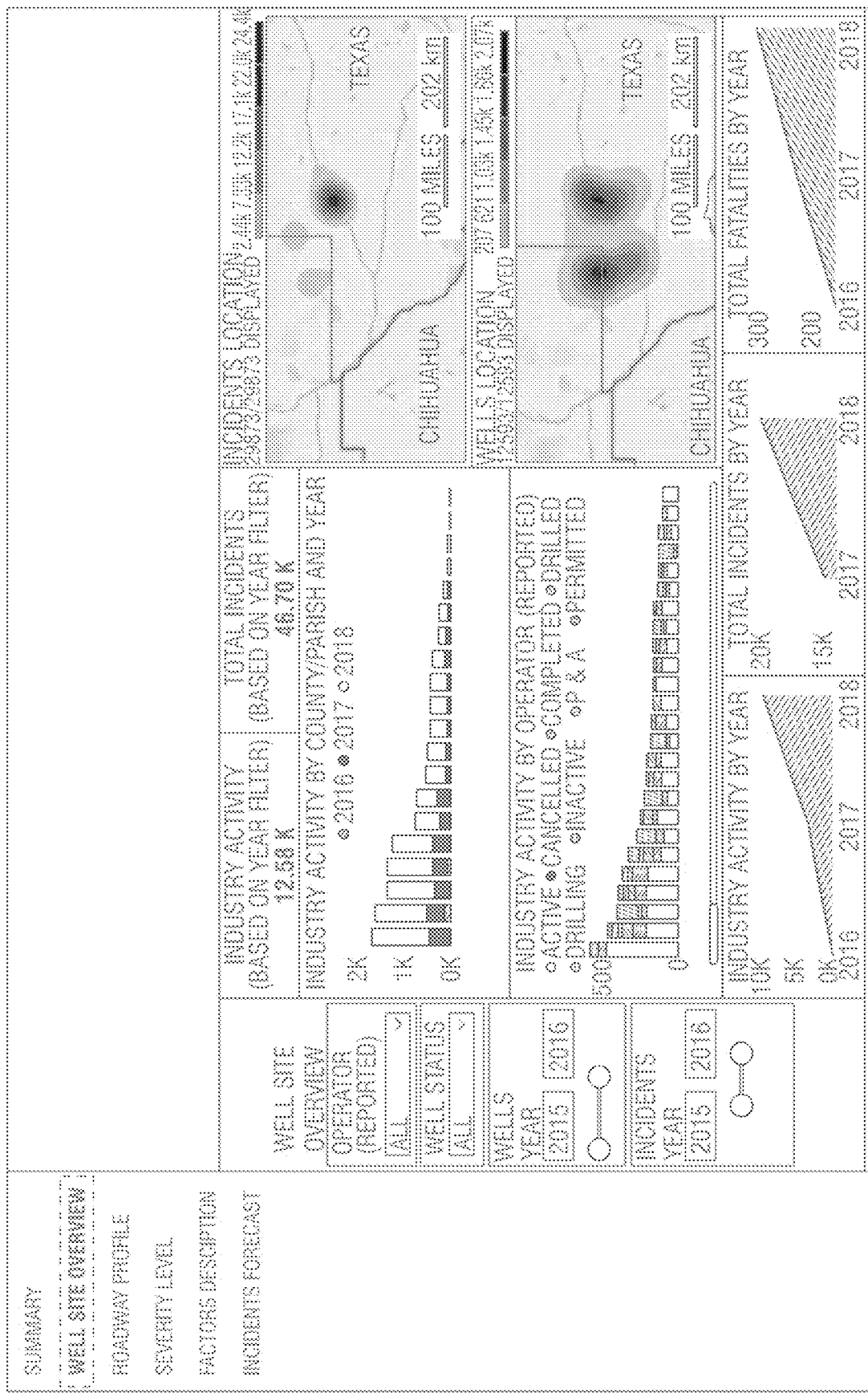
FIG. 6 is a screenshot of a well site overview tool of the dashboard.

FIG. 6 is a screenshot of a well site overview tool of the dashboard. The data can be filtered and sorted by operator, well status, year, well year, and incident years. Incident location is displayed on a map, along with well location. Plots can include industry activity by country and year, industry activity by operator by year, industry activity by year, total incidents by year, and total fatalities by year.

Figure 7:
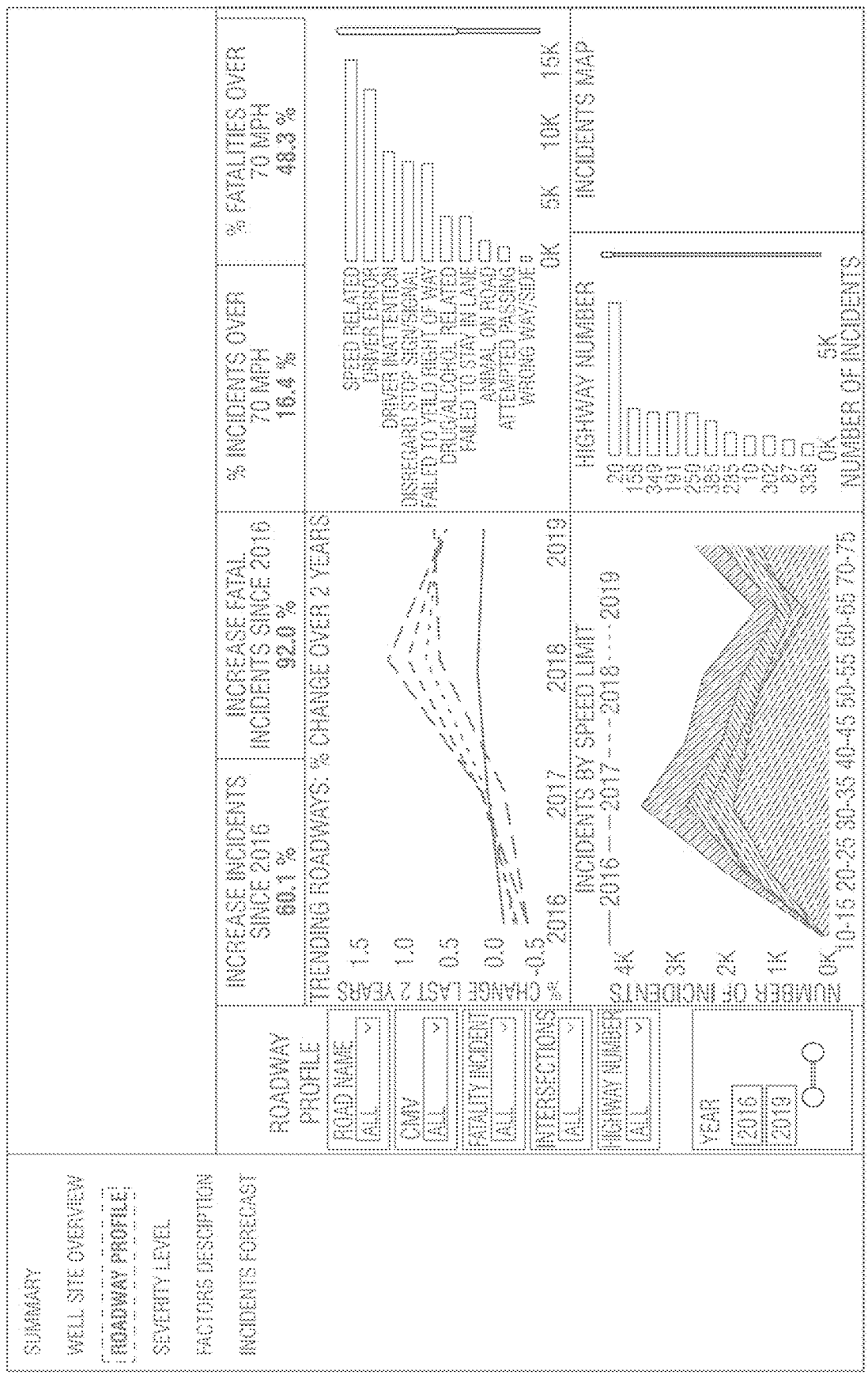
FIG. 7 is a screenshot of a roadway profile tool of the dashboard.
Figure 8:
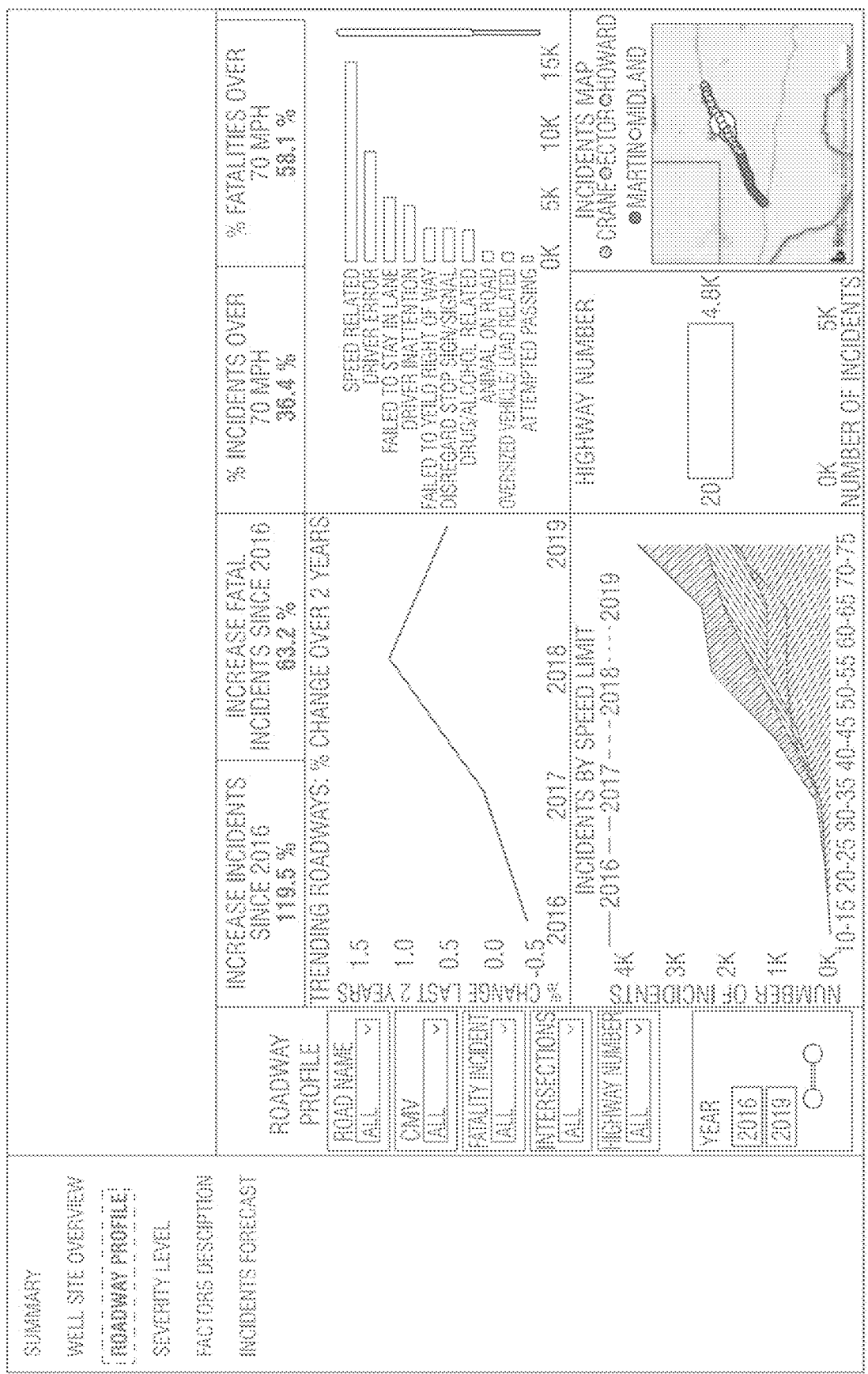
FIG. 8 is another screenshot of the roadway profile tool of the dashboard filtered by highway IH0020.

FIG. 7 is a screenshot of a roadway profile tool of the dashboard. The data can be filtered and/or sorted by road name, commercial vehicle type, fatality incident, intersections, highway number, and year. Plots and calculations can include increase in incidents, increase in fatal incidents, % incidents over 70 mph and % fatalities over 70 mph, trading roadways % change over 2 years including major highways, factors group, incidents by speed limit, highway number, and map. Factor groups include speed related, driver error, driver inattention, disregard of stop sign/signal, failed to yield right of way, drug/alcohol related, failed to stay in lane, animal on road, attempted passing, wrong way/side. FIG. 8 is another screenshot of the roadway profile tool of the dashboard filtered by highway IH0020.

Figure 9:
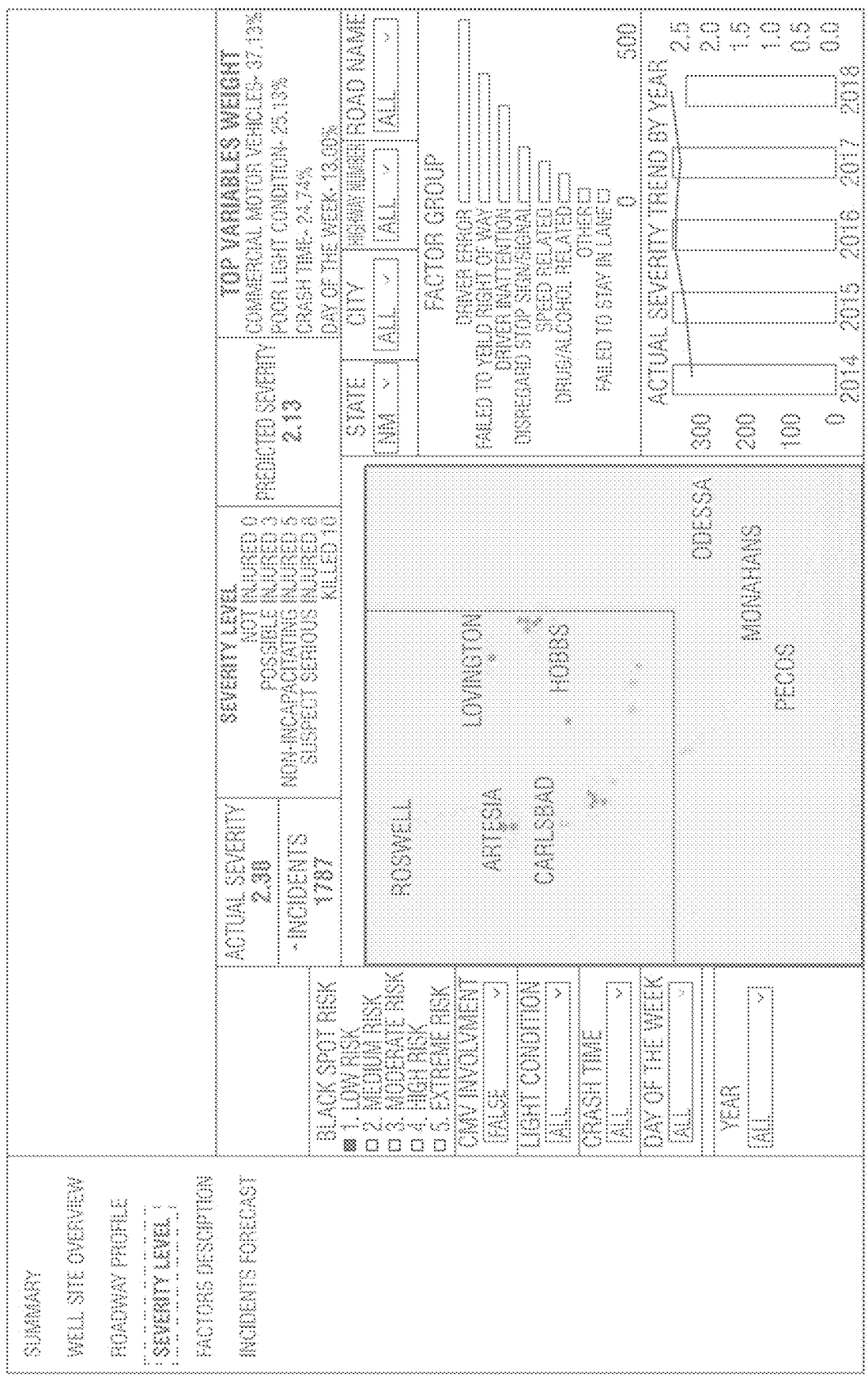
FIG. 9 is a screenshot of the map tool of the dashboard.
Figure 10:
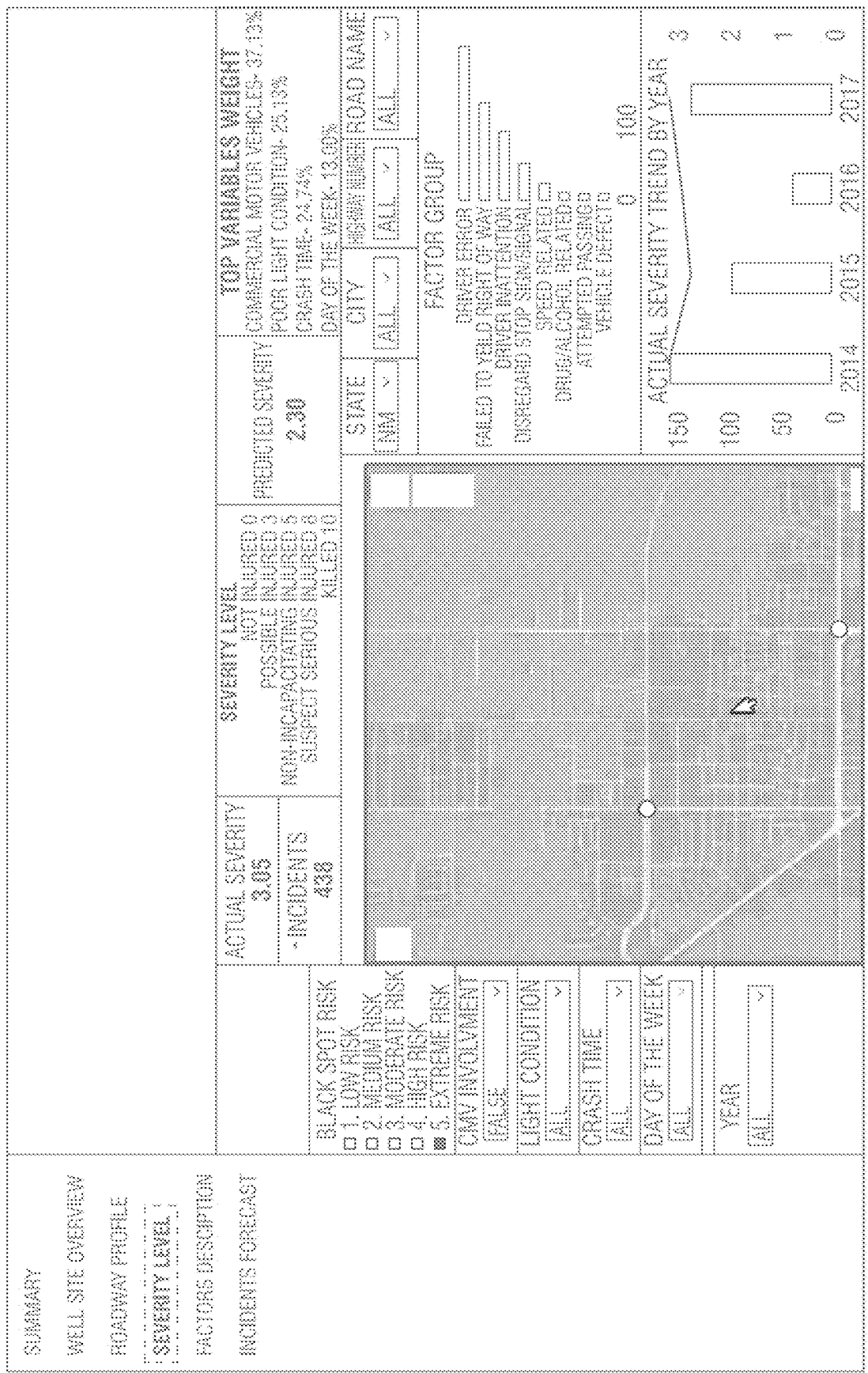
FIG. 10 illustrates a map showing high risk intersections.
Figure 11:
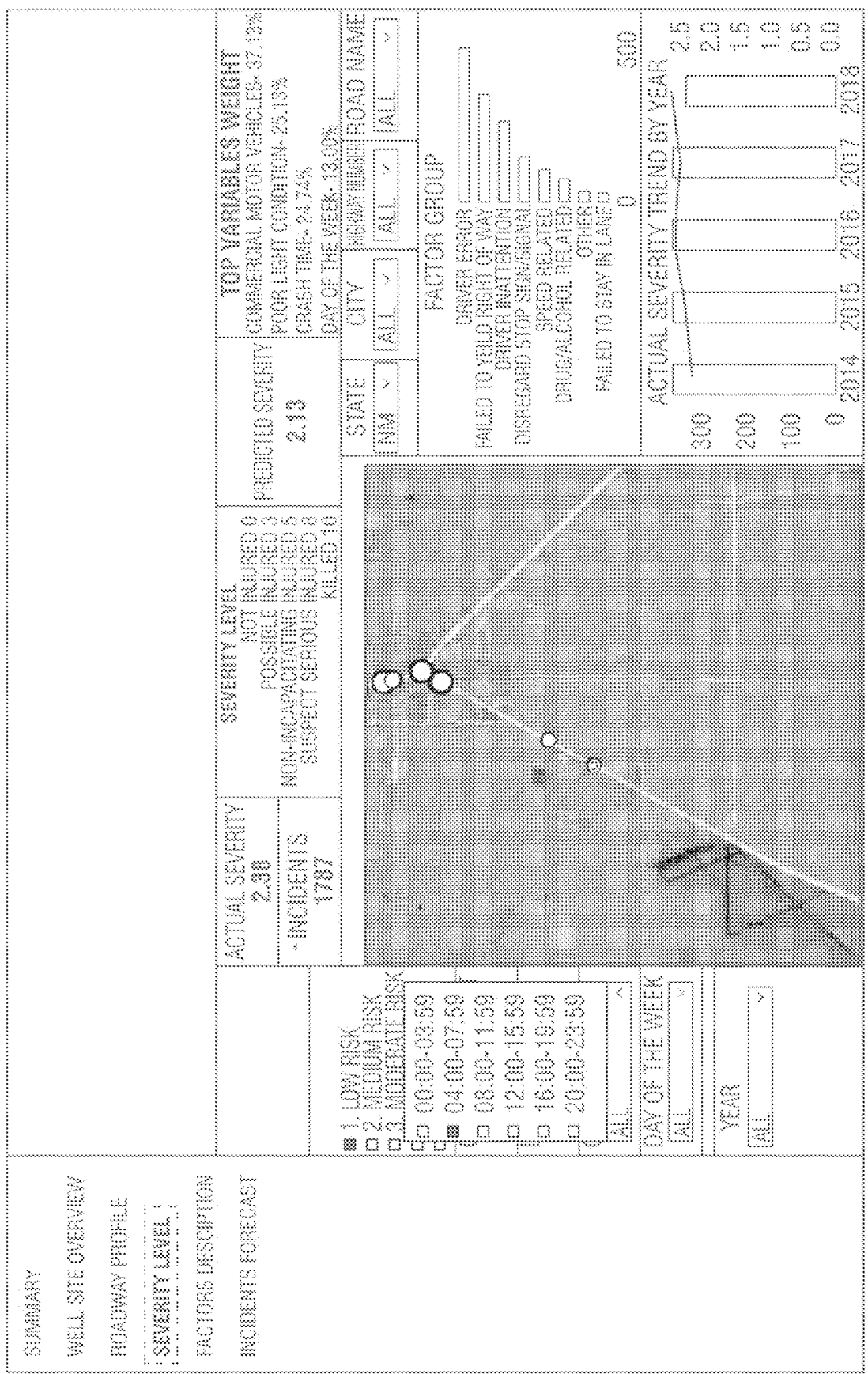
FIG. 11 is a screen shot which illustrates that maps can also be filtered and sorted by time of day and/or day of week.

FIG. 9 is a screenshot of the map tool of the dashboard. The tool can be filtered and/or sorted by risk index, crash value, if a commercial vehicle was involved, the light condition, the crash time, the day of week, the year, state, city, highway number, and road name. Plots and calculations can include crash value, severity index, number of incidents and actual severity trend by year. FIG. 10 illustrates a map showing high risk intersections. In embodiments, such high-risk intersections should be routed around. FIG. 11 is a screen shot which illustrates that maps can also be filtered and sorted by time of day and/or day of week. That is, routing can consider if an intersection or stretch of road is high risk during rush hours and low risk at other times.

Figure 12:
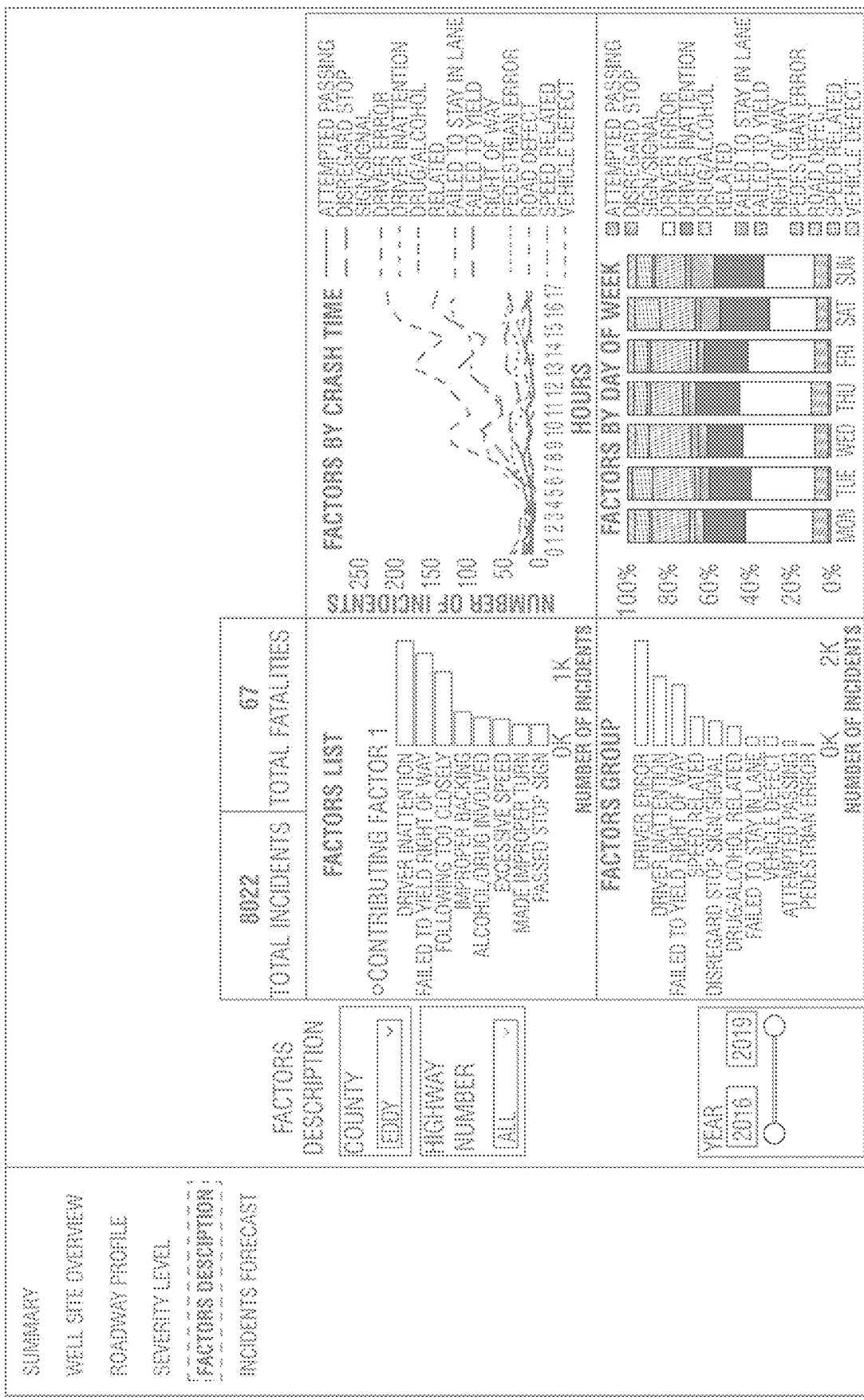
FIG. 12 is a screen shot of the factors descriptions tool of the dashboard.

FIG. 12 is a screen shot of the factors descriptions tool of the dashboard. The tool can be filtered and/or sorted by county, highway number, and year. Plots and calculations can include contributing factors, factor groups (contributing factors that have been grouped by type), factors by crash time, and factors by day of week. Contributing factors include driver inattention, failed to yield right of way, following too closely, improper backing, alcohol/drug, excessive speed, improper turn, passed stop sign. Factor groups include driver error, driver inattention, failed to yield right of way, speed related, disregarded stop sign or signal, drug/alcohol related, failed to stay in lane, vehicle defect, attempted passing, and pedestrian error.

Figure 13:
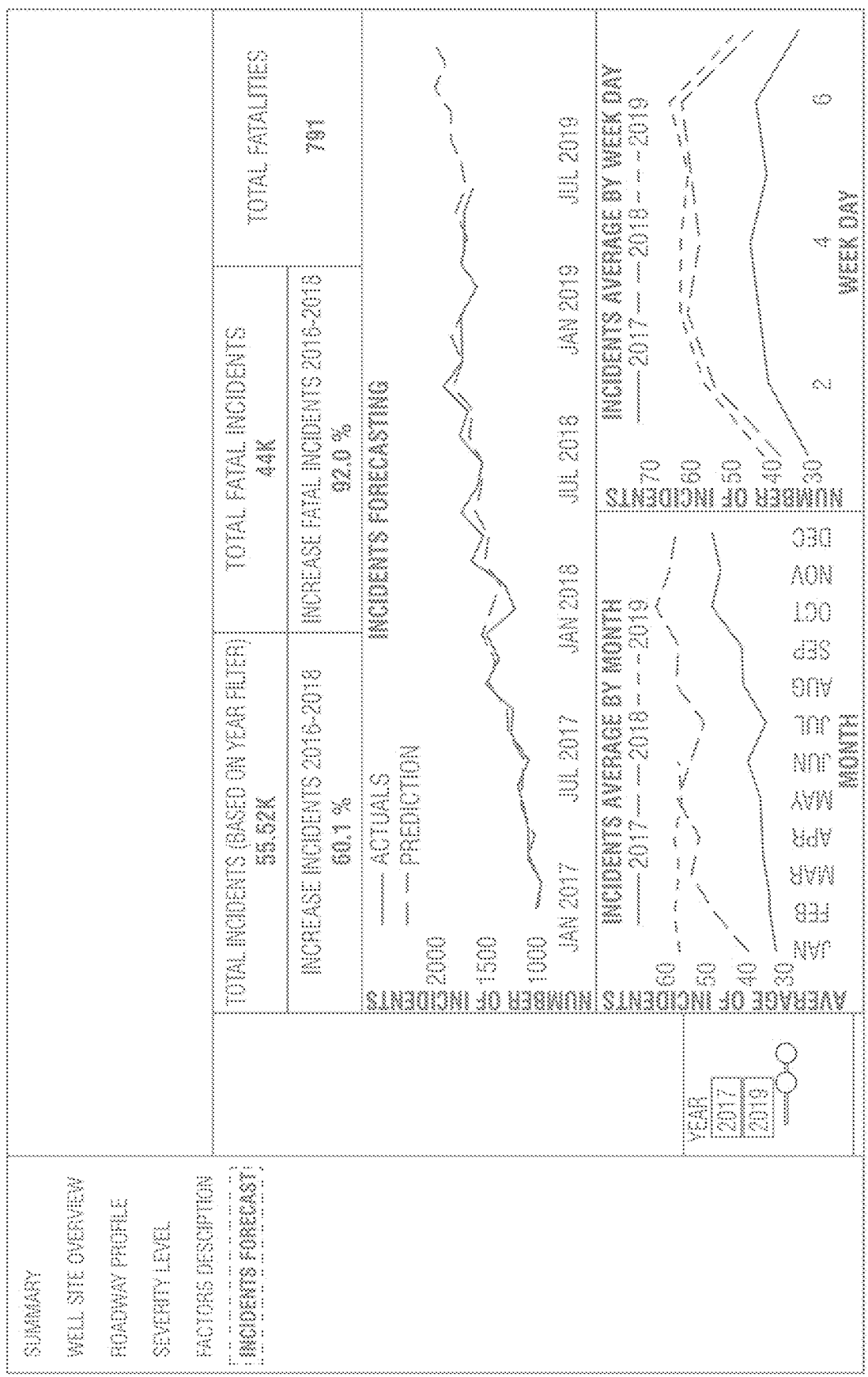
FIG. 13 is a screen shot of the incident forecast tool of the dashboard.

FIG. 13 is a screen shot of the incident forecast tool of the dashboard. The data can be filtered by year. Plots and calculations can include incident forecasting, incident forecast by month, and incident predicted average by weekday. Prediction can be calculated using a time series forecasting model. Embodiments of the disclosure include calculating predicted incidents and reported predicted high-risk locations.

Example Routing Platform

In an example embodiment of a routing platform, users can enter an origin and destination, hourly time window, day of the week, and month. The platform then generates a plurality of route options (e.g., by calling the Google Maps Directions API). Each route option can be overlaid onto a map comprising a grid of crash values to show high risk areas along the route. The platform calculates the risk score of each route option based on different times of day and days of the week using the historical incident data. The platform displays scheduling and may indicate a preference or recommendation for one or more of the presented routing options based on safety.

A general embodiment is a method of routing vehicles comprising receiving data related to the safety of a plurality of locations, a starting location, and an ending location. The data related to the safety of a plurality of locations can be data derived from the dashboard, which can include a risk of a location, such as an intersection. The data related to the safety of a plurality of locations can also include data at different times, dates and days of the week. For example, an intersection can be high risk at 7 am, but low risk at noon. Directions are calculated from the starting location to the end location based on the starting location, the end location, and the data related to the safety of a plurality of locations. That is, high and extreme risk intersections can be routed around. The risk can be based on the crash value given in a specific cell within a grid overlaid on a geographic area of interest. The directions are then transmitted to a vehicle or user. Directions can also be calculated by first calculating a plurality of routes from the starting location to the end location and then determining which route is the safest given the data related to the safety of a plurality of locations. For example, if the data related to the safety of a plurality of locations includes a high-risk intersection (or cell) within a route that has been calculated at the time the vehicle would arrive at that intersection, that route may be determined to be a high-risk route and a lower risk route would be chosen to be transmitted to the vehicle or user. In some embodiments, the vehicle is a self-driving vehicle. The directions may also take into account school zones and school arrival and dismissal information and route drivers around such areas.

Figure 14:
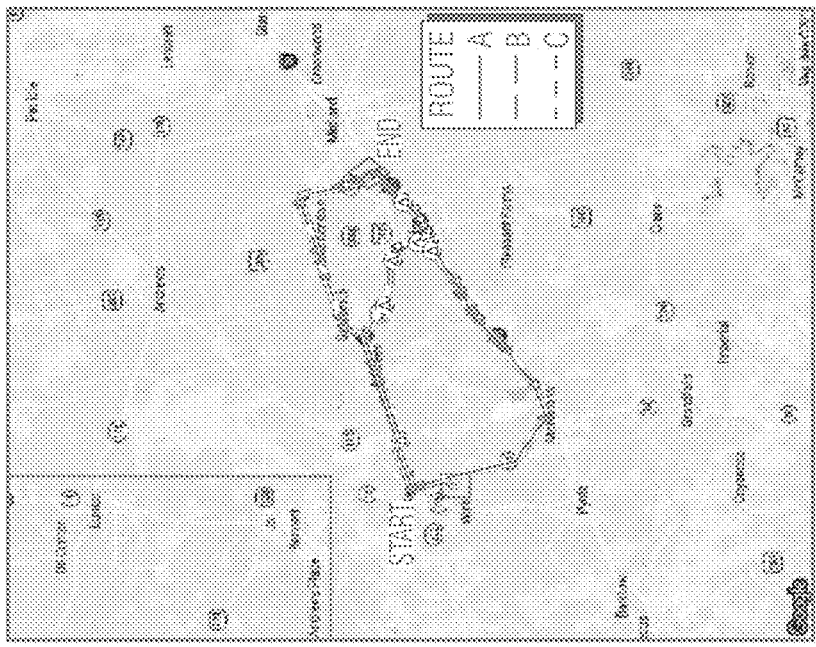
FIG. 14 is an example of a route calculation.

FIG. 14 is an example of a route calculation. Route A begins by going south and then turning north east. Route B begins by going east to the far right corner and then goes south. Route C starts by going east (following route B) and turning south east near the midpoint until it connects with route A, and then following route A to the end point. The calculated risk for each day and time is shown. Note that the route with the lowest risk is not necessarily the fastest.

Example Method of Creating a Vehicle Safety Dashboard

Figure 15:
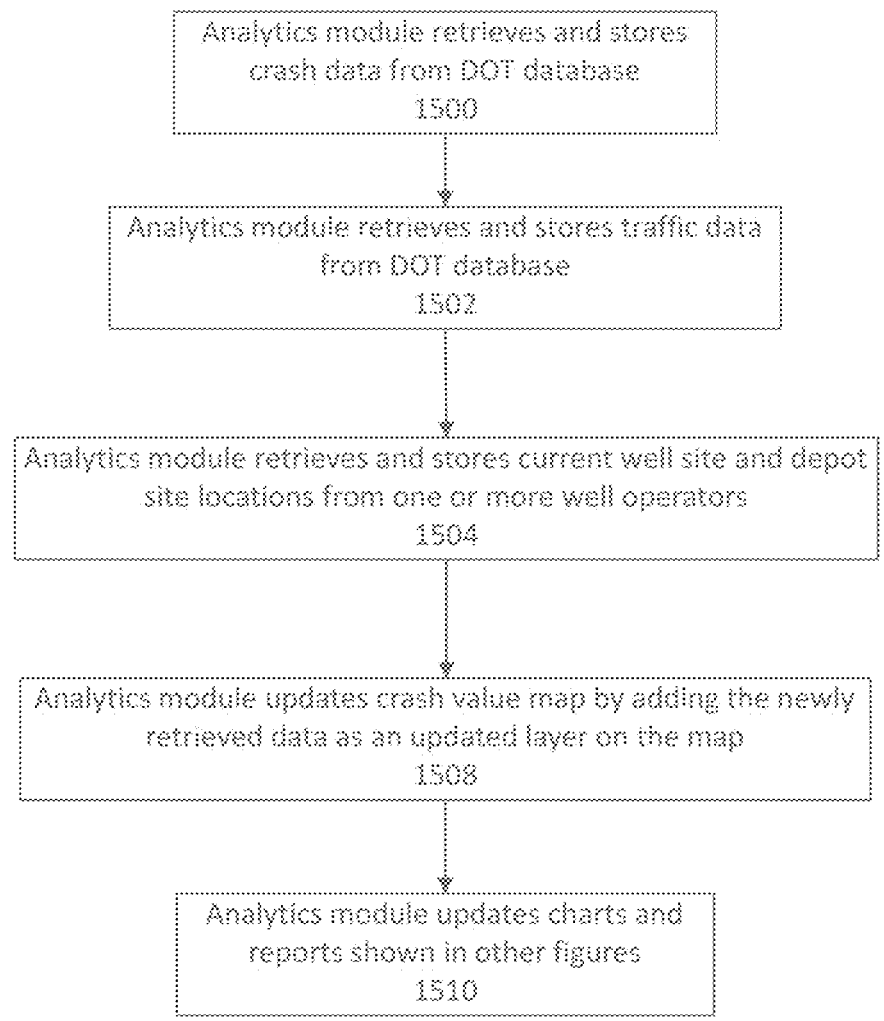
FIG. 15 is a flow chart which illustrates an example method of creating a vehicle safety dashboard.

FIG. 15 illustrates an example of implementing a method for determining the safety of roadways. First, in step 1500, an analytics software module 628 retrieves and stores vehicle incident data from a DOT database. This data can include one or more of crash location, date, time, type of vehicle, and incident severity. In this example, crash data is pulled from the Texas Department of Transportation (TxDOT) Crash Records Information System (CRIS) and the New Mexico Department of Transportation (NMDOT) Statewide Traffic Records System (STRS). The Texas crash data is organized by county and must be retrieved individually for each county. Additionally, the Texas crash data typically only includes the year of the crash. Accordingly, the complete date information for each crash for a particular year can be retrieved with a separate query to the Crash Records Information System and stored in a date data file. The Texas crash data files are aggregated into one crash data file before merging with an aggregated Texas date data file. The Texas date data files include the date specific data and associated fields but do not include the crash data associated with the date data. The Texas date data files are pulled for each individual year of interest and include all Texas counties for that year. The Texas date data files are aggregated into one date data file before merging with the aggregated Texas crash data file.

The New Mexico DOT Statewide Traffic Records System provides complete location, date, and time vehicle crash data within one file. Thus, the New Mexico vehicle crash data does not need to be aggregated. The New Mexico data file and the Texas data files are then merged into a final global data file containing Texas and New Mexico vehicle crash data.

The vehicle incident data that is available in different department of transportation databases can vary. For example, some data bases can also include factor data associated with the vehicle incident such as whether the incidents were caused by driver inattention, driver failure to yield, alcohol or drugs, or excessive speed. The vehicle incident data can be updated regularly as needed.

Next, in step 1502, the analytics module 628 retrieves and stores traffic data from the DOT databases. The Texas traffic data can be downloaded automatically via an API call to the TXDOT ARCGis API. The traffic data can be updated as needed and can reflect historical average daily traffic.

In step 1504, the analytics module 628 retrieves and stores current well site and depot site locations from one or more well operators. The well site and depot site data is useful in an oil or gas field application of the system because these are the destinations to which the vehicles typically will be traveling in and around the oil and gas fields. The well site and depot site data can be updated as needed. The well site and depot site data can also include information such as whether the well is currently being constructed or whether the well is currently producing.

In step 1508, after the new vehicle incident data is retrieved, the overlay of grid cells on the map is updated by calculating new crash values using the method described in connection with FIG. 2a. A default criteria for determining high risk areas can also be updated. The default value used for identifying high risk areas in this example is the top 1 percentile, however, the threshold percentile for high risk areas can be adjusted as desired. As one example, the updated overlay of grid cells can be implemented as a .csv file containing crash values which is loaded into Google MyMaps. In step 1510, the analytics software module 628 also updates charts and reports analyzing the risk data, such as the charts and report illustrated in FIGS. 5-14. The example method illustrated in FIG. 15 can be updated as frequently as needed.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A method for routing an autonomous vehicle using an analytics module executed by a processor of a computer system, the method comprising:

receiving, by the analytics module from a computer data storage system, historical data related to a plurality of vehicle incidents for a geographic area of interest, wherein the data comprises a date, a time, a location, a type of incident, and an indication of severity;

overlaying, by the analytics module executed by the processor, a grid of cells onto a map of the geographic area of interest;

calculating, by the analytics module executed by the processor, a crash value for each cell of the grid based on the historical data related to the plurality of vehicle incidents;

receiving, by the analytics module from a mapping software module, a starting location and an ending location;

receiving, by the analytics module from the mapping software module, potential routes from the starting location to the ending location;

calculating, by the analytics module executed by the processor, a risk score for each of the potential routes based on the crash value for each cell through which the potential route passes;

transmitting a selected route from the potential routes to the autonomous vehicle, wherein the selected route is selected based on its risk score; and controlling, autonomously, an operation of the autonomous vehicle in accordance with the selected route.

2. The method of claim 1, wherein the location is one or more of an intersection; a block, a highway, a stretch of highway, an on-ramp, a coordinate, or an off-ramp.

3. The method of claim 1, wherein the data related to the plurality of vehicle incidents is received from a state transportation database.

4. The method of claim 1, wherein each of the potential routes is ranked by its risk score.

5. The method of claim 1, wherein the selected route has a safest risk score.

6. The method of claim 1, wherein calculating the crash value for each cell comprises assigning a higher weighting to more recent data and a lower weighting to older data.

7. The method of claim 1, wherein calculating the crash value for each cell comprises basing the crash value on one or more of a time of day or a day of week.

8. The method of claim 1, wherein calculating the crash value for each cell comprises calculating a first crash value for a first time of day and calculating a second crash value for a second time day.

9. The method of claim 1, wherein calculating the crash value for each cell comprises calculating a first crash value for a first day of the week and calculating a second crash value for a second day of the week.

10. The method of claim 1, wherein the risk score is an average of the crash value for each cell through which the potential route passes.

11. The method of claim 1, wherein calculating the crash value for each cell includes applying a weighting factor for an average traffic volume.

12. The method of claim 1, wherein the data related to the plurality of vehicle incidents includes a factor indicating the cause of each vehicle incident of the plurality of vehicle incidents.

13. The method of claim 1, further comprising receiving, by the analytics module, data related to well sites in the geographic area of interest.

14. A method of scheduling a driving route and controlling an autonomous vehicle, the method comprising:

receiving, by an analytics module, a starting location and an ending location;

determining, by the analytics module, a plurality of routes between the starting location and the ending location, each route of the plurality of routes associated with a time of day;

calculating, by the analytics module, a risk score for each route determined, wherein the risk score is based on historical crash values along each route at the associated time of day and wherein the historical crash values are assigned to cells of a grid of cells that overlays a map of the plurality of routes;

transmitting, to the autonomous vehicle, a selected route and associated time of day from the plurality of routes; and controlling, autonomously, an operation of the autonomous vehicle in accordance with the selected route.

15. The method of claim 14, wherein the selected route and associated time of day has the lowest risk score among the plurality of routes.

16. The method of claim 14, further comprising transmitting, to the vehicle or user, the plurality of routes, associated time of day, and an associated risk score.

17. The method of claim 14, wherein calculating the risk score for each route comprises averaging crash values of each cell through which the route passes.

18. The method of claim 14, wherein the crash values are based on vehicle incident data.

* * * * *